(12) United States Patent
Johnson et al.

(10) Patent No.: US 7,624,198 B1
(45) Date of Patent: Nov. 24, 2009

(54) SEQUENCE TAGGING SYSTEM AND METHOD FOR TRANSPORT OFFLOAD ENGINE DATA LISTS

(75) Inventors: Michael Ward Johnson, Livermore, CA (US); Andrew Currid, Alameda, CA (US); Mrudula Kanuri, Santa Clara, CA (US); John Shigeto Minami, Honolulu, HI (US)

(73) Assignee: NVIDIA Corporation, Santa Clara, CA (US)

( * ) Notice: Subject to any disclaimer, the term of this patent is extended or adjusted under 35 U.S.C. 154(b) by 877 days.

(21) Appl. No.: 10/741,128

(22) Filed: Dec. 19, 2003

(51) Int. Cl.
*G06F 15/16* (2006.01)
(52) U.S. Cl. ...................................................... 709/250
(58) Field of Classification Search .................. 709/224, 709/236, 250
See application file for complete search history.

(56) References Cited

U.S. PATENT DOCUMENTS

| | | | |
|---|---|---|---|
| 212,889 A | 3/1879 | Bridenthal, Jr. et al. | |
| 4,807,111 A | 2/1989 | Cohen et al. | 364/200 |
| 4,839,851 A | 6/1989 | Maki | 364/900 |
| 5,012,489 A | 4/1991 | Burton et al. | 375/8 |
| 5,056,058 A | 10/1991 | Hirata et al. | 364/900 |
| 5,161,193 A | 11/1992 | Lampson et al. | 380/49 |
| 5,163,131 A | 11/1992 | Row et al. | 395/200 |
| 5,307,413 A | 4/1994 | Denzer | 380/49 |
| 5,426,694 A | 6/1995 | Hebert | 379/242 |
| 5,430,727 A | 7/1995 | Callon | 370/85.13 |
| 5,440,551 A | 8/1995 | Suzuki | 370/60 |
| 5,455,599 A | 10/1995 | Cabral et al. | 345/133 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,544,357 A | 8/1996 | Huei | 395/600 |
| 5,546,453 A | 8/1996 | Herbert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |

(Continued)

FOREIGN PATENT DOCUMENTS

AU 4595297 5/1998

(Continued)

OTHER PUBLICATIONS

Muller, Raimund, LON-das universelle Netzwerk Elektronik 22-1991.

(Continued)

*Primary Examiner*—Jeffrey Pwu
*Assistant Examiner*—Farhad Ali
(74) *Attorney, Agent, or Firm*—Zilka-Kotab, PC

(57) ABSTRACT

A system and method are provided for communicating data in a network utilizing a transport offload engine. Included is a data list object that describes how data communicated in a network is to be stored (i.e. placed, etc.) in memory (i.e. application memory). Stored in association (i.e. located, kept together, etc.) with the data list object is a sequence object. Such sequence object identifies a sequence space associated with the data to be stored using the data list object. To this end, the sequence object is used by a transport offload engine to determine whether or not incoming data is to be stored using the data list object.

32 Claims, 8 Drawing Sheets

U.S. PATENT DOCUMENTS

| | | | |
|---|---|---|---|
| 5,577,237 A | 11/1996 | Lin | 395/555 |
| 5,579,316 A | 11/1996 | Venters et al. | 370/94.1 |
| 5,581,686 A | 12/1996 | Koppolu et al. | 395/340 |
| 5,596,702 A | 1/1997 | Stucka et al. | 395/340 |
| 5,598,410 A | 1/1997 | Stone | 370/469 |
| 5,619,650 A | 4/1997 | Bach et al. | 395/200.01 |
| 5,621,434 A | 4/1997 | Marsh | 345/145 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,650,941 A | 7/1997 | Coelho et al. | 364/514 |
| 5,663,951 A | 9/1997 | Danneels et al. | 370/230 |
| 5,664,162 A | 9/1997 | Dye | 345/521 |
| 5,666,362 A | 9/1997 | Chen et al. | 370/420 |
| 5,675,507 A | 10/1997 | Bobo, II | 364/514 |
| 5,678,060 A | 10/1997 | Yokoyama et al. | 395/831 |
| 5,680,605 A | 10/1997 | Torres | 395/603 |
| 5,684,954 A | 11/1997 | Kaiserwerth et al. | 395/200.2 |
| 5,687,314 A | 11/1997 | Osman et al. | 395/200 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,852 A | 3/1998 | Zias et al. | 395/334 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,754,556 A | 5/1998 | Ramseyer et al. | 371/10.3 |
| 5,754,768 A | 5/1998 | Brech et al. | 395/200.6 |
| 5,761,281 A | 6/1998 | Baum et al. | 379/93.29 |
| 5,778,178 A | 7/1998 | Arunachalam | 395/200.33 |
| 5,790,546 A | 8/1998 | Dobbins et al. | 370/400 |
| 5,790,676 A | 8/1998 | Ganesan et al. | 380/23 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,854,750 A | 12/1998 | Phillips et al. | 364/478.04 |
| 5,870,549 A | 2/1999 | Bobo, II | 395/200.36 |
| 5,870,622 A | 2/1999 | Gulick et al. | 395/800.35 |
| 5,872,919 A | 2/1999 | Wakeland | 395/200.6 |
| 5,877,764 A | 3/1999 | Feitelson et al. | 345/347 |
| 5,894,557 A | 4/1999 | Bade et al. | 395/200.58 |
| 5,909,546 A | 6/1999 | Osborne | 395/200.42 |
| 5,918,051 A | 6/1999 | Savitzky et al. | 395/683 |
| 5,920,732 A | 7/1999 | Riddle | 395/876 |
| 5,923,892 A | 7/1999 | Levy | 395/800.31 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,946,487 A | 8/1999 | Dangelo | 395/705 |
| 5,966,534 A | 10/1999 | Cooke et al. | 395/705 |
| 5,968,161 A | 10/1999 | Southgate | 712/37 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,049,857 A | 4/2000 | Watkins | 711/207 |
| 6,061,368 A | 5/2000 | Hitzelberger | 370/537 |
| 6,061,742 A | 5/2000 | Stewart et al. | 709/250 |
| 6,076,115 A | 6/2000 | Sambamurthy et al. | 709/250 |
| 6,078,736 A | 6/2000 | Guccione | 395/500.17 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden | 713/201 |
| 6,185,619 B1 | 2/2001 | Joffe et al. | 709/229 |
| 6,208,651 B1 | 3/2001 | Van Renesse et al. | 370/392 |
| 6,226,680 B1 | 5/2001 | Boucher et al. | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher et al. | 709/238 |
| 6,247,068 B1 | 6/2001 | Kyle | 709/328 |
| 6,289,012 B1 * | 9/2001 | Harrington et al. | 370/389 |
| 6,327,625 B1 | 12/2001 | Wang et al. | 709/235 |
| 6,330,659 B1 | 12/2001 | Poff et al. | 712/34 |
| 6,334,153 B2 | 12/2001 | Boucher et al. | 709/230 |
| 6,341,129 B1 | 1/2002 | Schroeder et al. | 370/354 |
| 6,345,301 B1 | 2/2002 | Burns et al. | 709/230 |
| 6,347,347 B1 | 2/2002 | Brown et al. | 710/23 |
| 6,389,479 B1 | 5/2002 | Boucher et al. | 709/243 |
| 6,389,537 B1 | 5/2002 | Davis et al. | 713/187 |
| 6,393,487 B2 | 5/2002 | Boucher et al. | 709/238 |
| 6,397,316 B2 | 5/2002 | Fesas, Jr. | 711/200 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,430,628 B1 | 8/2002 | Connor | 710/5 |
| 6,434,620 B1 | 8/2002 | Boucher et al. | |
| 6,460,080 B1 | 10/2002 | Shah et al. | 709/224 |
| 6,470,415 B1 | 10/2002 | Starr et al. | 711/104 |
| 6,530,061 B1 | 3/2003 | Labatte | 714/807 |
| 6,591,302 B2 | 7/2003 | Boucher et al. | 709/230 |
| 6,609,225 B1 | 8/2003 | Ng | 714/781 |
| 6,629,141 B2 | 9/2003 | Elzur et al. | 709/224 |
| 6,658,480 B2 | 12/2003 | Boucher et al. | 709/239 |
| 6,687,758 B2 | 2/2004 | Craft et al. | 709/250 |
| 6,697,868 B2 | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,807,581 B1 | 10/2004 | Starr et al. | 709/250 |
| 6,938,092 B2 | 8/2005 | Burns | 709/230 |
| 6,941,386 B2 | 9/2005 | Craft et al. | 709/250 |
| 6,965,941 B2 | 11/2005 | Boucher et al. | 709/230 |
| 6,968,358 B2 * | 11/2005 | Freimuth et al. | 709/203 |
| 6,996,070 B2 | 2/2006 | Starr et al. | 370/252 |
| 7,042,898 B2 | 5/2006 | Blightman | 370/463 |
| 7,149,819 B2 * | 12/2006 | Pettey | 709/250 |
| 7,260,631 B1 * | 8/2007 | Johnson et al. | 709/224 |
| 2001/0021949 A1 | 9/2001 | Blightman et al. | 709/219 |
| 2001/0023460 A1 | 9/2001 | Boucher et al. | 709/250 |
| 2001/0025315 A1 | 9/2001 | Jolitz | 709/231 |
| 2001/0027496 A1 | 10/2001 | Boucher et al. | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher et al. | 709/250 |
| 2002/0055993 A1 | 5/2002 | Shah et al. | 709/223 |
| 2002/0085562 A1 | 7/2002 | Hufferd et al. | 370/392 |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0120899 A1 | 8/2002 | Gahan et al. | 714/748 |
| 2002/0147839 A1 | 10/2002 | Boucher | 709/238 |
| 2002/0156927 A1 | 10/2002 | Boucher et al. | 709/250 |
| 2002/0161919 A1 | 10/2002 | Boucher | 709/238 |
| 2002/0163888 A1 | 11/2002 | Grinfeld | 370/235 |
| 2003/0005142 A1 | 1/2003 | Elzur et al. | 709/232 |

| | | | | | | |
|---|---|---|---|---|---|---|
| 2003/0005143 | A1 | 1/2003 | Elzur et al. ............... 709/232 | CA | 2328829AA | 12/1999 |
| 2003/0014544 | A1 | 1/2003 | Pettey ........................ 709/249 | CA | 2265692 C | 8/2001 |
| 2003/0016669 | A1 | 1/2003 | Pfister et al. ............... 370/392 | CN | 1237295 A | 12/1999 |
| 2003/0031172 | A1 | 2/2003 | Grinfeld ..................... 370/389 | CN | 1266512 T | 9/2000 |
| 2003/0046330 | A1 | 3/2003 | Hayes ........................ 709/201 | CN | 1305681 T | 7/2001 |
| 2003/0046418 | A1 | 3/2003 | Raval et al. ................ 709/237 | TW | 447205 B | 7/2001 |
| 2003/0056009 | A1 | 3/2003 | Mizrachi et al. ........... 709/245 | TW | 448407 B | 8/2001 |
| 2003/0058870 | A1 | 3/2003 | Mizrachi et al. ....... 370/395.52 | WO | WO 98/21655 | 5/1998 |
| 2003/0061505 | A1 | 3/2003 | Sperry et al. ............... 713/200 | WO | WO 98/35480 | 8/1998 |
| 2003/0066011 | A1 | 4/2003 | Oren .......................... 714/758 | WO | WO 98/50852 | 11/1998 |
| 2003/0079033 | A1 | 4/2003 | Craft et al. ................. 709/230 | WO | WO 99/65219 | 12/1999 |
| 2003/0084185 | A1 | 5/2003 | Pinkerton | WO | WO0013091 A1 | 3/2000 |
| 2003/0095567 | A1 | 5/2003 | Lo et al. ..................... 370/466 | WO | WO 01/13583 | 2/2001 |
| 2003/0115350 | A1 | 6/2003 | Uzrad-Nali et al. ......... 709/231 | WO | WO 01/28179 | 4/2001 |
| 2003/0115417 | A1 | 6/2003 | Corrigan ..................... 711/118 | WO | WO 02/27519 | 4/2002 |
| 2003/0128394 | A1 | 7/2003 | Mizrachi et al. ............ 370/394 | WO | WO 02/39302 | 5/2002 |
| 2003/0140124 | A1 | 7/2003 | Burns ......................... 709/220 | WO | WO 02/059757 | 8/2002 |
| 2003/0145101 | A1 | 7/2003 | Mitchell et al. ............. 709/236 | WO | WO 02/086674 | 10/2002 |
| 2003/0145270 | A1 | 7/2003 | Holt ............................ 714/766 | WO | WO 02/088893 | 11/2002 |
| 2003/0167346 | A1 | 9/2003 | Craft et al. .................. 709/250 | WO | WO 03/021443 | 3/2003 |
| 2003/0200284 | A1 | 10/2003 | Philbrick et al. ............ 709/219 | WO | WO 03/021447 | 3/2003 |
| 2004/0003126 | A1 | 1/2004 | Boucher et al. ............. 709/250 | WO | WO 03/021452 | 3/2003 |
| 2004/0042458 | A1 | 3/2004 | Elzu ........................... 370/394 | WO | WO 2004/019165 | 3/2004 |
| 2004/0042464 | A1 | 3/2004 | Elzur et al. ............ 370/395.52 | WO | WO 2004/021143 | 3/2004 |
| 2004/0042483 | A1 | 3/2004 | Elzur et al. ................. 370/463 | WO | WO 2004/021626 | 3/2004 |
| 2004/0047361 | A1 | 3/2004 | Fan et al. .................... 370/411 | WO | WO 2004/021627 | 3/2004 |
| 2004/0049580 | A1 | 3/2004 | Boyd et al. ................. 709/226 | WO | WO 2005/057945 A2 | 6/2005 |
| 2004/0049601 | A1* | 3/2004 | Boyd et al. ................. 709/250 | WO | WO 2005/057945 A3 | 6/2005 |
| 2004/0054813 | A1 | 3/2004 | Boucher et al. ............. 709/250 | | | |
| 2004/0062245 | A1 | 4/2004 | Sharp ......................... 370/392 | | | |
| 2004/0062246 | A1 | 4/2004 | Boucher ...................... 370/392 | | | |
| 2004/0062267 | A1* | 4/2004 | Minami et al. .............. 370/463 | | | |
| 2004/0064578 | A1 | 4/2004 | Boucher ...................... 709/236 | | | |
| 2004/0064589 | A1 | 4/2004 | Boucher ...................... 709/250 | | | |
| 2004/0064590 | A1 | 4/2004 | Starr ........................... 709/250 | | | |
| 2004/0073703 | A1 | 4/2004 | Boucher ...................... 709/245 | | | |
| 2004/0078462 | A1 | 4/2004 | Philbrick .................... 709/224 | | | |
| 2004/0088262 | A1 | 5/2004 | Boucher ...................... 705/65 | | | |
| 2004/0100952 | A1 | 5/2004 | Boucher ...................... 370/389 | | | |
| 2004/0111535 | A1 | 6/2004 | Boucher ...................... 709/250 | | | |
| 2004/0117509 | A1 | 6/2004 | Craft ........................... 709/250 | | | |
| 2004/0125751 | A1 | 7/2004 | Vangal et al. ............... 370/252 | | | |
| 2004/0133713 | A1 | 7/2004 | Elzur et al. .................. 710/52 | | | |
| 2004/0158640 | A1 | 8/2004 | Philbrick et al. ............ 709/230 | | | |
| 2004/0158793 | A1 | 8/2004 | Blightman .................. 714/758 | | | |
| 2004/0190516 | A1* | 9/2004 | Williams ..................... 370/392 | | | |
| 2004/0193733 | A1 | 9/2004 | Vangal et al. ............... 709/250 | | | |
| 2004/0240435 | A1 | 12/2004 | Boucher ...................... 370/352 | | | |
| 2004/0249998 | A1 | 12/2004 | Rajagopalan et al. ......... 710/30 | | | |
| 2005/0080928 | A1 | 4/2005 | Beverly et al. .............. 709/245 | | | |
| 2005/0122986 | A1 | 6/2005 | Starr et al. ................... 370/412 | | | |
| 2005/0141561 | A1 | 6/2005 | Craft et al. .................. 370/474 | | | |
| 2005/0160139 | A1 | 7/2005 | Boucher et al. ............. 709/203 | | | |
| 2005/0165985 | A1 | 7/2005 | Vangal et al. ............... 710/107 | | | |
| 2005/0175003 | A1 | 8/2005 | Craft et al. .................. 370/389 | | | |
| 2005/0182841 | A1 | 8/2005 | Sharp ......................... 709/228 | | | |
| 2005/0198198 | A1 | 9/2005 | Craft et al. .................. 709/217 | | | |
| 2005/0204058 | A1 | 9/2005 | Philbrick et al. ............ 709/238 | | | |
| 2005/0278459 | A1 | 12/2005 | Boucher et al. ............. 709/250 | | | |
| 2006/0010238 | A1 | 1/2006 | Craft et al. .................. 709/227 | | | |
| 2007/0062245 | A1 | 3/2007 | Fuller et al. ................... 72/413 | | | |

FOREIGN PATENT DOCUMENTS

| | | |
|---|---|---|
| AU | 7364898 | 11/1998 |
| AU | 4435999 | 12/1999 |
| AU | 723724 | 9/2000 |
| AU | 0070603 | 3/2001 |
| AU | 734115 | 6/2001 |
| AU | 0741089 | 11/2001 |
| AU | 0228874 | 5/2002 |
| CA | 2265692AA | 5/1998 |
| CA | 2287413AA | 11/1998 |

OTHER PUBLICATIONS

Abbot, Mark B.; Peterson, Larry L., "Increasing Network Trhoguhput by Integrating Protocol Layers" IEEE 1993.

Wright, Maury, Low-Cost Control LANs Add Automation to Homes, Autos, and Offices EDN-Technology Jul. 20, 1992.

Preston, David J., "Internet Protocols Migrate To Silicon For Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.

Agrawal et al. "Architecture and Design of the Mars Hardware Accelerator", ACM 1987, pp. 101-107.

Case, "Implementing the Java Virtual Machine", Microprocessor Report, Mar. 1996.

Kitadeya et al., "Matsushita Launches Web TV Internet Connection Terminal", http://www.mei.co.jp/corp/news/official.data/data.dir/en981112-1/en981112-1.html, Nov. 1998.

iReady Product Data Sheet, Internet Tuner.

Johnson et al. , "Internet Tuner", New Media News, http://www.newmedianews.com/020197/ts.sub- inettuner.html, Jan. 1997.

Kelly, T., "Cheap Internet Hardware that Fits in Everything", ZDNet, http://www.zdnet.co.uk/news/1998/44/ns-5998.html, Nov. 1998.

Tannenbaum, Andrew S., "Structured Computer Organization Fourth Edition" Prentice-Hall International, 1990.

European Search Report from application No. 98989558 completed on Nov. 10, 2005.

Wright, Maury, Low-Cost Control LANs Add Automation to Homes, Autos, and Offices EDN-Technology Jul. 20, 1992.

Preston, David J., "Internet Protocols Migrate To Silicon For Networking Devices" Electronic Design Apr. 14, 1997.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Wayner, "Sun Gambles on Java Chops", Bytes, Nov. 1996.

Raz, "Real Time Program Language Accelerator", WO 98/21655, May 1998.
Agrawal et al. "Architecture and Design of the Mars Hardware Accelerator", ACM 1987, pp. 101-107.
Case, "Implementing the Java Virtual Machine", Microprocessor Report, Mar. 1996.
Kitadeya et al., "Matsushita Launches Web TV Internet Connection Terminal", http://www.mei.co.jp/corp/news/official.data/data.dir/en981112-1/en981112-1.html, Nov. 1998.
iReady Product Data Sheet, Internet Tuner.
Johnson et al. , "Internet Tuner", New Media News, http://www.newmedianews.com/020197/ts.sub- inettuner.html, Jan. 1997.
Kelly, T., "Cheap Internet Hardware that Fits in Everything", ZDNet, http://www.zdnet.co.uk/news/1998/44/ns-5998.html, Nov. 1998.
8802-3:2000 ISO/IEC Information Technology, http://www.computer.org/cspress/CATALOG/st01118.htm.
INCITS: Development work conducted in t10-I/0 Interface-Lower Level Sep. 30, 2002 Weber, Ralph O.
Stevens, Richard W., "TCP/IP Illustrated Volume" Addison-Wesley Professional Computing Series.
Abbot, Mark B., and Peterson, Larry L., "Increasing Network Throughput by Integrating Protocol Layers" IEEE 1993.
Wright, Maury, "Low-Cost Control LANs Add Automation to Homes, Autos, and Offices" EDN Jul. 20, 1992.
Preston, David J., "Internet Protocols Migrate to Silicon For Networking Devices" Electronic Design Apr. 14, 1997.
Muller, Raimund, "LON—das universelle Netzwerk" Electronik 22/1991.
Rang, Michael; Tantawy, Ahmed, "A Design Methodology for Protocol Processors" IEEE 1995.
Banks, David and Prudence, Michael, "A High-Performance Network Architecture for a PA-RISC Workstation" IEEE Journal vol. II, No. 22 Feb. 1993.
Steenkiste, Peter, "A High-Speed Network Interface for Distributed-Memory Systems: Architecture and Applications" ACM Transactions on Computer Systems, vol. 15, No. 1 Feb. 1997.
Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.
Womack, Lucas; Mraz, Ronald; Mendelson, Abraham, "A Study of Virtual Memory MTU Reassembly withing the PowerPC Architecture" IEEE 1997.
Steenkiste, Peter, "A Systematic Approach to Host Interface Design for High-Speed Networks" IEEE Mar. 1994.
Wittie, Larry D., Ma, Fanyuan, "A TCP/IP Communication Subsystem in Micros" IEEE 1987.
Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.
Gupta, Pankaj; McKeown, Nick, "Algorithms for Packet Classification" IEEE Network Mar./Apr. 2001.
Clark, David D.; Romkey, John; Salwen, Howard, "An Analysis of TCP Processing Overhead" IEEE 1988.
Clark, David D.; Jacobson, Van; Romkey, John; Salwen, Howard, "An Analysis of TCP Processing Overhead" IEEE Jun. 1989.
Goloi, W.K.; Behr, P. "An IPC Protocol and Its Hardware Realization For A High-Speed Distributed Multicomputer System" IEEE 1981.
Ames, Richard, "Building an Embedded Web Server from Scratch" Circuit Cellar INK Feb. 1998.
Legg, John, "Choosing and implementing an embedded TCP/IP Stack" Electronic Product Design Jan. 1999.
Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.
Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.
Varada, S.; Yang, Y.; Evans, D., "Data and Buffer Management in ATM Systems" TranSwitch Corporation.
Bonjour, Dominique; de Hauteclocque, Gaelle; le Moal, Jacques, "Design and Application of ATM LAN/WAN Adapters" IEEE 1998.
Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.
Steenkiste, Peter, "Design, Implementation, and evaluation of a Single-copy Protocol Stack" Software—Practice and Experience, vol. 28, Jun. 1998.
Meleis, Hanafy E.; Serpanos, Dimitrios, N., "Designing Communication Subsystems for High-Speed Networks" IEEE Network Jul. 1992.
Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.
Mora, F.; Sebastia, A., "Electronic Design of a High Performance Interfacce to the SCI Network" IEEE 1998.
Eady, Fred, "Embedded Internet Part 2: TCP/IP and a 16-Bit Compiler" Embedded PC Jun. 1999.
Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.
Mansour, Mohammad; Kayssi, Ayman, "FPGA-Based Internet Protocol Version 6 Router" IEEE 1998.
Smith, Jonathon M.; Traw, C. Brendan S., "Giving Applications Access to Gb/s Networking" IEEE Network Jul. 1993.
Traw, C. Brendan S.; Smith, Jonathan M., "Hardware/Software Organization of a High-Performance ATM Host Interface" IEEE 1993.
Nagata, Takahiko; Hosoda, Yamashita, Hiroyuki, "High-Performance TCP/IP/ATM Communication Board" NTT Information and Communication Systems Laboratories 1998.
Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.
Jolitz, William Frederick, "High-Speed Networking: Header prediction and forward-error correction for very high-speed data transfer" Dr. Dobbs Journal, Aug. 1992.
Chiswell, Dave "Implementation Challenges for 155Mbit ATM Adapters" ISBN# 0-7803-2636-9.
Wright, Maury "Intelligent Ethernet Boards" EDN Jun. 23, 1988.
Preston, David "Intetnet Protocols Migrate to Silicon For Networking Devices" Electronic Design Apr. 14, 1997.
Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.
Druschel, Peter; Abbot, Mark B.; Pagels, Michael A.; Peterson, Larry L., "Network Subsystem Design"IEEE Network Jul. 1993.
Huange, Jau-Hsiung; Chen, Chi-Wen, "On Performance Measurments of TCP/IP and its Device Driver" IEEE 1992.
Siegel, Martin; Williams, Mark; Robler, Georg, "Overcoming Bottlenecks in High-Speed Transport Systems" IEEE 1991.
Neufeld, Gerald W.; Ito, Mabo Robert; Goldberg, Murray; McCutcheon, Mark J.; Ritchie, Stuart, "Paralleel Host Interface for an ATM Network" IEEE Network Jul. 1993.
Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Networking, IV, 1993 IFIP.
Laskman, T.V.; Madhow, U., "Performance Analysis of Window-based Flow Control using TCP/IP:Effect of High Bandwidth Delay Products and Random Loss" High Performance Networking V. 1994 IFIP.
Ramakrishnan, K.K., "Performance Considerations in Designing Network Interfaces" IEEE Journal1993.
Camarda, P.; Pipio, F.; Piscitelli, G.; "Performance evaluating of TCP/IP implementations in end systems" IEE Proc-Computer Digital Tech. vol. 146 No. 1 Jan. 1999.
Toyoshima, Kan; Shirakawa, Kazuhiro; Hayashi, Kazuhiro, "Programmable ATM Adapter: Rapid Prototyping of Cell Processing Equipment for ATM Network" IEEE 1997.
Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" EEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www.newmedianews.com/02197/ts_inettuner.html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

Eady Product Data Sheet, Internet Tuner.

Luijten, Ronald P., "An OC-12 ATM Switch Adapter Chipset" 1998 IEEE.

"Less-Numerical Algorithms", Ch. 20 p. 888-895.

"Storage Networking Industry Association" iSCSI Building Blocks for IP Storage Networking, www.ipstorage.org.

* cited by examiner

SEQUENCE TAGGING SYSTEM AND METHOD FOR TRANSPORT OFFLOAD ENGINE DATA LISTS

FIELD OF THE INVENTION

The present invention relates to transport offload engines, and more particularly to transport offload engine data lists [i.e. scatter-gather lists (SGLs), memory-descriptor lists (MDLs), etc.].

BACKGROUND OF THE INVENTION

Transport offload engines (TOE) are gaining popularity in high-speed systems for the purpose of optimizing throughput and lowering processor utilization. TOE components are often incorporated into one of various systems including printed circuit boards such as a network interface card (NIC), a host bus adapter (HBA), a motherboard; or in any other desired offloading context.

In recent years, the communication speed in networks has increased faster than processor speed. This increase has produced an input/output (I/O) bottleneck. The processor, which is designed primarily for computing and not for I/O, cannot typically keep up with the data flowing through networks. As a result, the data flow is processed at a rate slower than the speed of the network. TOE technology solves this problem by removing the burden from the processor (i.e. offloading processing) and/or I/O subsystem.

Prior art FIG. 1 illustrates a system 100 including both a host processor 102 and a transport offload engine 104 (i.e. TOE), in accordance with the prior art. In use, the transport offload engine 104 receives segmented data in packets via a network 116. Once received, the transport offload engine 104 stores the data in a TOE buffer 112, in order to provide time to generate a data available message 117 and send the message to the host processor 102. The foregoing operation of the transport offload engine 104 may be governed by control logic 114 of the transport offload engine 104.

In response to a data available message 117, the host processor 102 generates a data list object 106 [i.e. a scatter-gather list (SGL), etc.] that describes the location or locations in application memory 110 where the incoming data is ultimately to be stored. As shown, to accomplish this, the data list object 106 may include at least one memory start address where the data is to be stored, with each start address followed by the length of a region in memory.

In use, the host processor 102 generates and associates the data list object 106 with a socket (also known as a connection) associated with the received data that prompted the corresponding data available message 117. The incoming data is then be copied from the TOE buffer 112 to the application memory locations described by the corresponding data list object 106.

Thus, to receive a large amount of data via the network 116, the required size of the TOE buffer 112 may become excessively large. Unfortunately, a large TOE buffer 112 can not be implemented in a cost-effective manner on an integrated-circuit transport offload engine 104, since integrating on-board memory on the transport offload engine 104 is costly in terms of silicon die area, for example.

While there is a general desire to minimize, or even altogether eliminate, TOE buffer memory (i.e. see, for example, TOE buffer 112, etc.) on the transport offload engine 104, such an implementation is problematic. Specifically, without buffering incoming data using the TOE buffer 112, it is impossible for the aforementioned data available messages 117 to be generated and thus impossible to generate and allocate a data list object 106, which in turn prevents the storage of data in application memory.

There is thus an urgent need for a more cost-effective technique for managing and storing received data using data list objects (i.e. SGLs, etc.) in the context of a transport offload engine.

SUMMARY OF THE INVENTION

A system and method are provided for communicating data in a network utilizing a transport offload engine. Included is a data list object that describes how data communicated in a network is to be stored (i.e. placed, saved, etc.) in memory (i.e. application memory). Stored in association (i.e. located, kept together, etc.) with the data list object is a sequence object. Such sequence object identifies a sequence space associated with the data to be stored using the data list object. To this end, the sequence object is used by a transport offload engine to determine whether or not incoming data is to be stored using the data list object.

In one embodiment, the data list object may include at least one data address that describes a location in application memory where the data communicated in the network is ultimately to be stored. Still yet, the data list object may include at least one length that identifies the length of a region in application memory. As an option, the data list object may take the form of a scatter-gather list (SGL), a memory-descriptor list (MDL), etc. The use of an SGL or MDL is a technique to describe a non-contiguous region of application memory using an ordered list of address and length pairs.

In an exemplary embodiment, the sequence object may include a sequence object number that identifies a point in the sequence space. Still yet, such sequence object may further include a sequence object length that identifies the length of the sequence space.

In use, it may be determined whether the incoming data on a connection is in the sequence space associated with the data list object for that connection. If it is determined that the incoming data is in the sequence space associated with the data list object, an offset may be calculated. Such offset may be calculated from a start point of the data list object, and a sequence number associated with the incoming data. The incoming data may then be directly stored in application memory using the data list object and the offset.

On the other hand, if it is determined that the incoming data is not in the sequence space associated with the data list object, the incoming data may be temporarily stored in a buffer. Such buffer may be a host buffer associated with a processor or may be a transport offload engine (TOE) buffer associated with the TOE. Still yet, a status message may be sent from the transport offload engine to the processor. Such status message may allow subsequent (i.e. subsequent to the receipt of the incoming data) association of the incoming data with another (i.e. new) data list object. To enable the creation of this new data list object, the status message may identify a host buffer address or TOE buffer address associated with the incoming data and/or a sequence number associated with the incoming data.

In another embodiment, a first portion of the incoming data may be stored in the buffer, wherein the first data portion exists at a point after a start of a data stream. Moreover, a remaining (i.e. following) portion of the incoming data may be stored using a data list object.

In yet another embodiment, a first portion of the incoming data may be stored in the TOE buffer, wherein the first data portion exists at a point after a start of a data stream. Moreover, a remaining (i.e. following) portion of the incoming data may be stored using a data list object.

BRIEF DESCRIPTION OF THE DRAWINGS

Prior art

DETAILED DESCRIPTION

Figure 2:
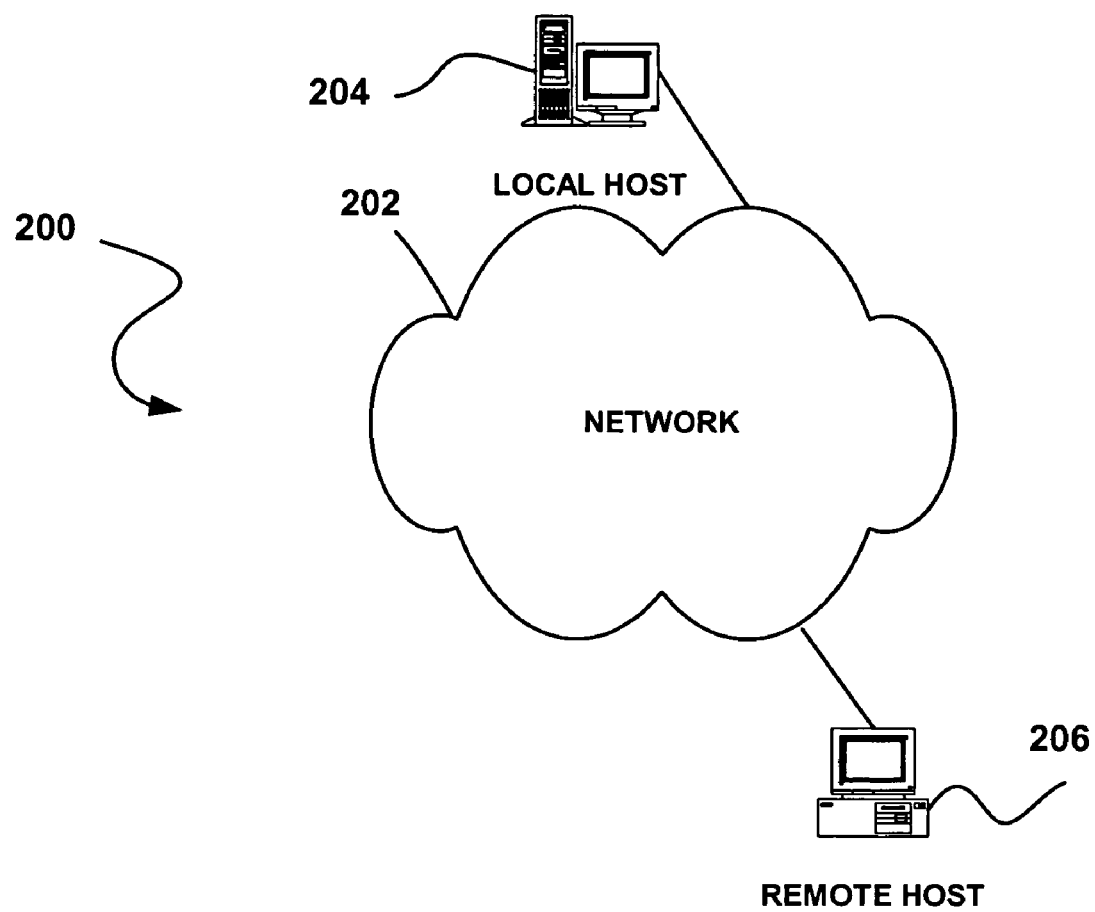
FIG. 2 illustrates a network system, in accordance with one embodiment.

FIG. 2 illustrates a network system 200, in accordance with one embodiment. As shown, a network 202 is provided. In the context of the present network system 200, the network 202 may take any form including, but not limited to a local area network (LAN), a wide area network (WAN) such as the Internet, etc.

Coupled to the network 202 are a local host 204 and a remote host 206 which are capable of communicating over the network 202. In the context of the present description, such hosts 204, 206 may include a web server, storage device or server, desktop computer, lap-top computer, hand-held computer, printer or any other type of hardware/software. It should be noted that each of the foregoing components as well as any other unillustrated devices may be interconnected by way of one or more networks.

Figure 3:
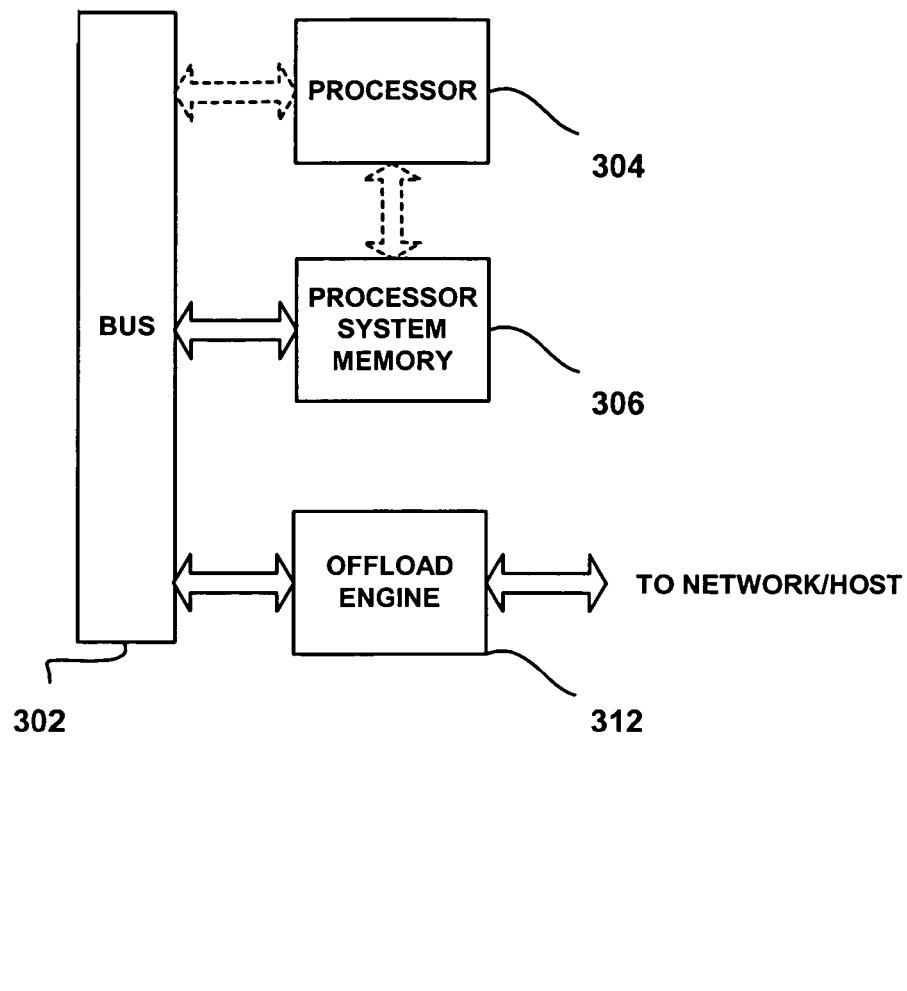
FIG. 3 illustrates an exemplary architecture in which one embodiment may be implemented.

FIG. 3 illustrates an exemplary architecture 300 in which one embodiment may be implemented. In one embodiment, the architecture 300 may represent one of the hosts 204, 206 of FIG. 2. Of course, however, it should be noted that the architecture 300 may be implemented in any desired context.

For example, the architecture 300 may be implemented in the context of a general computer system, a circuit board system, a game console system dedicated for entertainment purposes, a set-top box, a router, a network system, a storage system, an application-specific system, or any other desired system associated with the network 202.

As shown, the architecture 300 includes a plurality of components coupled via a bus 302. Included is at least one processor 304 for processing data. While the processor 304 may take any form, it may, in one embodiment, take the form of a central processing unit (CPU), a host processor, a chipset (i.e. a group of integrated circuits designed to work and sold as a unit for performing related functions, etc.), or any other desired processing device(s) capable of processing data.

Further included is processor system memory 306 which resides in communication with the processor 304 for storing the data. Such processor system memory 306 may take the form of on-board or off-board random access memory (RAM), a hard disk drive, a removable storage drive (i.e., a floppy disk drive, a magnetic tape drive, a compact disk drive, etc.), and/or any other type of desired memory capable of storing data.

In use, programs, or control logic algorithms, may optionally be stored in the processor system memory 306. Such programs, when executed, enable the architecture 300 to perform various functions. Of course, the architecture 300 may simply be hardwired.

Further shown is a transport offload engine 312 in communication with the processor 304 and the network (see, for example, network 202 of FIG. 2). In one embodiment, the transport offload engine 312 may remain in communication with the processor 304 via the bus 302. The transport offload engine 312 may include a TCP/IP transport offload engine or any system or integrated circuit(s) that is capable of managing the data transmitted in the network.

While a single bus 302 is shown to provide communication among the foregoing components, it should be understood that any number of bus(es) (or other communicating mechanisms) may be used to provide communication among the components. Just by way of example, an additional bus may be used to provide communication between the processor 304 and processor system memory 306.

During operation, the transport offload engine 312 and/or processor 304 uses a data list object for describing how data communicated in the network is stored (i.e. placed, saved, etc.) in application memory (see, for example, processor system memory 306). By virtue of the broad definition of "store" herein, such term is deemed to include the functionality of a protocol called Direct Data Placement (DDP) and other similar protocols that directly place data in the application memory.

Such data list object may include a scatter-gather list (SGL), a memory-descriptor list (MDL), and/or any other desired object capable of describing how data communicated in the network is stored in application memory.

Figure 4:
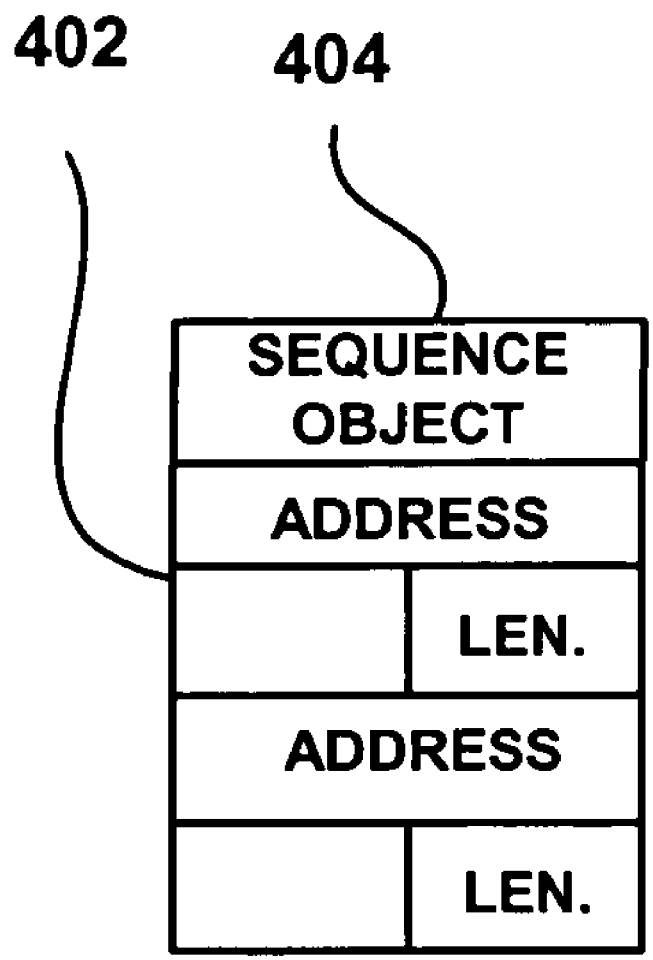
FIG. 4 illustrates an exemplary data list object, in accordance with one embodiment.

FIG. 4 illustrates an exemplary data list object 402, in accordance with one embodiment. As shown, the data list object 402 may include at least one data address that identifies the start location or locations in application memory to store the data communicated in the network. Still yet, the data list object 402 may include, for each data address, a length that identifies a region in the application memory. Of course, the data list object 402 may include any information that may facilitate describing how data communicated in the network is stored in application memory.

Figure 1:
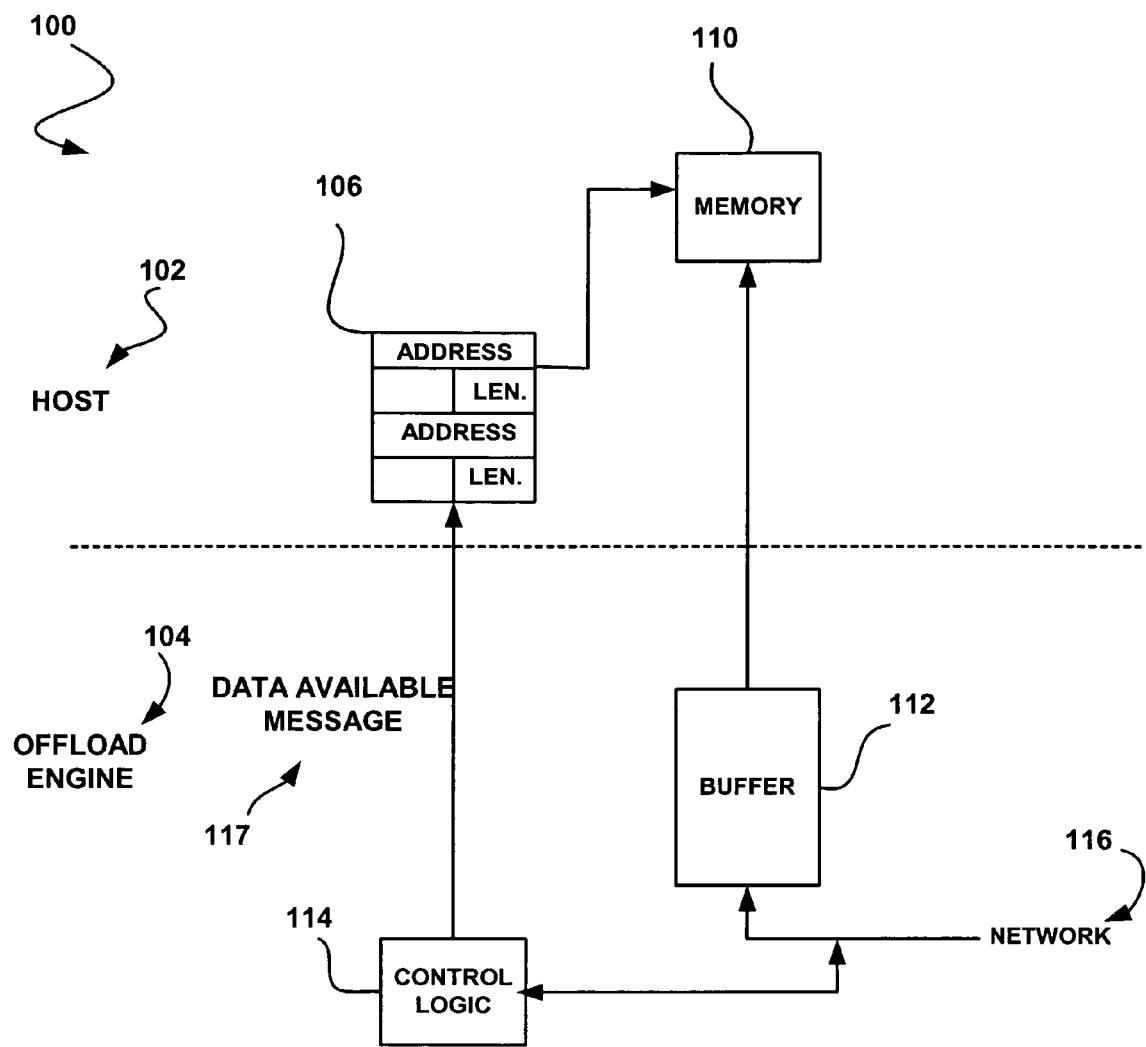
FIG. 1 illustrates a system including both a host processor and a transport offload engine, in accordance with the prior art.

As mentioned previously during reference to prior art FIG. 1, incoming data on a connection is buffered using a TOE buffer to provide an opportunity for the aforementioned data list object 402 to be associated with such data and connection. Of course, this TOE buffer requires significant storage memory resources on the transport offload engine 312.

In order to provide a more cost-effective technique for managing and storing incoming data from a network, the transport offload engine 312 further employs a sequence object 404 kept as a tag together with the data list object 402 in order to form a tagged data list object. Of course, the sequence object 404 may be stored in association with the data list object 402 in any desired manner. In use, such sequence object 404 identifies a sequence space associated with the data list object 402, and also associated with the data to be stored using the data list object 402. Thus, the sequence object 404 is used by the transport offload engine 312 to determine whether incoming data is to be directly stored in application memory using the data list object 402, or stored temporarily in a host buffer.

To this end, using a tagged data list object, the TOE buffer on the transport offload engine may optionally be at least minimized since a smaller TOE buffer is required, or it may be possible to eliminate the TOE buffer entirely. Moreover, the processor utilization may be lowered by avoiding data copy operations, in a manner that will soon be set forth. Of course, these benefits are merely optional.

More information will now be set forth regarding one system and method by which the transport offload engine 312 employs an exemplary sequence object 404 in the foregoing manner.

Figure 5A:
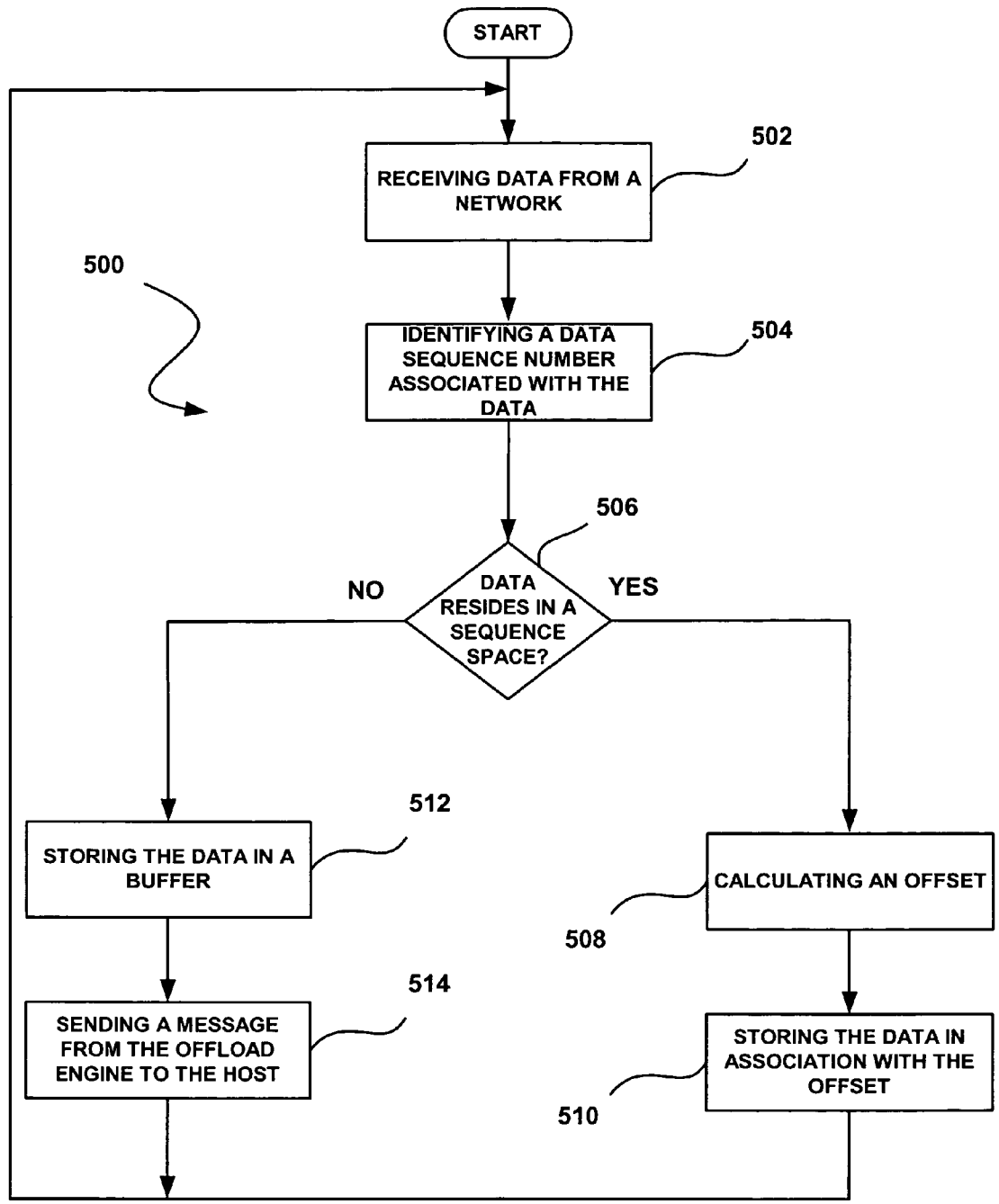
FIG. 5A illustrates an exemplary method for using tagged data list objects in managing network communications, in accordance with one embodiment.

FIG. 5A illustrates an exemplary method 500 for using tagged data list objects in managing network communications, in accordance with one embodiment. As an option, the method 500 may be carried out in the context of the exemplary architecture 300 of FIG. 3. Of course, however, it should be noted that the method 500 may be implemented in any desired context. Moreover, while various functions may be attributed to exemplary components (i.e. like those set forth hereinabove), it is important to understand that the various functionality may be carried out by any desired entity.

As shown in FIG. 5A, data is received from a network (i.e. see, for example, network 202, of FIG. 2) using a transport offload engine (i.e. see, for example, transport offload engine 312, of FIG. 3). See operation 502. Such data may be segmented (that is, divided into packets of various lengths) in accordance with any desired packet-based protocol (i.e. TCP, IP, etc.).

Upon receipt of the segmented data, a data sequence number associated with the data segment is identified, in accordance with operation 504. Such data sequence number may include a number identifying a sequence in which the segments of data are communicated on the network. For example, a data segment first communicated in time may include a first sequence number, a data segment next communicated in time may include a second subsequent sequence number, and so on. Of course, however, it should be noted that the data sequence number may include any sequence-related information associated with the data and that there are multiple forms and types of sequence numbering and identification schemes (including information also often known as tags or steering tags) depending on different protocols.

As the segmented data is received, it is then determined in decision 506, whether the data segment resides in a sequence space associated with a data list object (see, for example, the data list object 402, of FIG. 4). In the context of the present description, such sequence space may include any finite space that may be defined to determine which data should be stored using a data list object (based on the data sequence numbers).

Moreover, to facilitate the decision 506, a sequence object (see, for example, sequence object 404 of FIG. 4) kept together with the data list object may be used. In one embodiment, such sequence object may include a sequence object number and a sequence object length.

Specifically, the sequence object may include a sequence object number that identifies a point (i.e. start point, etc.) in the sequence space. Still yet, such sequence object may include a sequence object length that identifies a length of the sequence space. Of course, however, it should be noted that the sequence object may include any parameter(s) that defines the sequence space associated with the data list object, in order to facilitate the decision 506.

Given the data sequence number and the aforementioned sequence object, it may be determined whether the data sequence number falls within the sequence space, as defined by the sequence object number and the sequence object length. For example, if the sequence object number equals 0, and the sequence object length equals 100; any data sequence number between 0-99 would fall within the sequence space.

Thus, based on decision 506, it may be determined whether or not the data is associated with an existing data list object. If there is no existing association, the data may be temporarily stored in a separate host buffer (i.e. temporary buffer, holding buffer, eddy buffer, anonymous buffer, etc.) associated with a processor (i.e. see, for example, processor 304, of FIG. 3). For example, such host buffer may be located in system memory (i.e. see, for example, processor system memory 306 of FIG. 3). Of course, a TOE buffer may be used instead of the host buffer in the context of the present embodiment, if TOE buffering is not to be necessarily minimized. More information regarding such operation will now be set forth.

Thus, if it is determined in decision 506 that the data is in the sequence space associated with the data list object, an offset is calculated from a start point of the data list object. See operation 508. As an option, this may be accomplished by subtracting the data sequence number from the sequence object number of the sequence object. Thus, the data is directly stored in application memory using the address and length information of the data list object, and the calculated offset. Note operation 510.

If, on the other hand, it is determined in decision 506 that the data is not in the sequence space associated with the data list object, the data is temporarily stored in the host buffer associated with the processor. See operation 512. Such host buffer may serve to allow subsequent association of the data with another (i.e. new) data list object that may not yet exist, or the host buffer may serve to store data identified as belonging to a sequence space that precedes the sequence space associated with the aforementioned data list object, etc.

It should be noted that the aforementioned host buffer is separate from the aforementioned application memory associated with the data list objects. In the context of the present description, "separate" may refer to physically and/or logically separated and/or situated in the same and/or different physical memories.

Moreover, in operation 514, a status message from the transport offload engine may be sent to the processor. This status message may identify a host buffer address where the data is stored, along with, for example, the amount of data stored, and connection information associated with the data. Moreover, such message may further include the data sequence number associated with the data (see operation 504).

Table #1 illustrates an exemplary status message format. Such format is set forth for illustrative purposes only, and should not be considered as limiting in any manner.

TABLE #1

| Ver | Message Len | Message Code | Socket Handle |
|---|---|---|---|
|  |  | Sequence Number |  |
|  |  | Host Buffer Address |  |
|  | Reserved |  | Data Length |

Thus, using tagged data list objects, TOE buffering on the transport offload engine may optionally be at least minimized, since a smaller TOE buffer is then required, or it is possible to eliminate the TOE buffer entirely. Again, this is strictly an option. Moreover, processor utilization may be lowered by avoiding data copy operations incurred when an application running on the host has not associated application memory with a connection (also known as posting a buffer) to allow the direct storage of data in application memory.

Specifically, when an application has not posted buffers before the arrival of data on a connection, incoming data must be temporarily stored in a host buffer and status messages, such as a data available message, are then sent from the transport offload engine to the processor. In response to such status messages, the processor must then perform data copy operations (known as buffer copy or bcopy operations) to copy the data from the host buffer to the application memory. Such data copy operations are very expensive and inefficient with respect to processor utilization. Once the application has posted the buffers with the present embodiment, however, incoming data may be directly stored in application memory using the tagged data list objects, thus avoiding the expensive data copy operations.

Moreover, the present embodiment allows applications to be late in posting buffers by allowing data list objects to be used by incoming data in midstream. In other words, a first portion of the incoming data may be stored in the host buffer, wherein the first data portion exists at a point after a start of a data stream. Following this, after an application is late in posting a buffer, a remaining portion or a following portion of the incoming data may be stored directly in application memory using the data list object.

In order to enable the host buffers to be used (see operations 512 and 514) any time after the connection is created and it still be possible to store data directly at the correct offset in application memory (see operations 508 and 510), the aforementioned tagged data list scheme may be used. Using the tagged data list scheme, the data list object may contain a sequence object number starting from which the transport offload engine may directly store data into an application memory address that is contained in the first entry of the data list object.

The sequence object number in the data list object may also be a data sequence number expected in the future. See Table #2.

TABLE #2

| (data sequence number − sequence object number) + data list object address = application memory address |
|---|

The above difference between data sequence number and sequence object number may be a negative number if the data list object is tagged with a future sequence number (i.e. a data segment to arrive later, etc.). In this case, the data may be written into a host buffer (see operations 512 and 514). If a portion of the data segment falls in the sequence object number, the data may still be entirely written into the host buffer (see operations 512 and 514). Data starting with the next data segment, however, may then be directly stored in application memory thus avoiding further expensive data copy operations (see operations 508 and 510).

One possible scenario includes the situation where the available data list sequence space is too small for the incoming data segment. If the aforementioned difference discussed hereinabove in Table #2 is positive, but the length of the data segment is greater than the length of the available data list sequence space, the data segment may be entirely written into a host buffer (see operations 512 and 514) or partially written into the application memory. In the latter case, a status message, such as a data available message, from the offload engine to the processor may indicate a partial write or fill.

Another possible scenario includes the situation where the transport offload engine does not use the application memory that was posted by an application for a connection. In such case, the application (or device driver, for example) may be notified of unused application memory in the status message associated with a write to a host buffer.

Figure 5B:
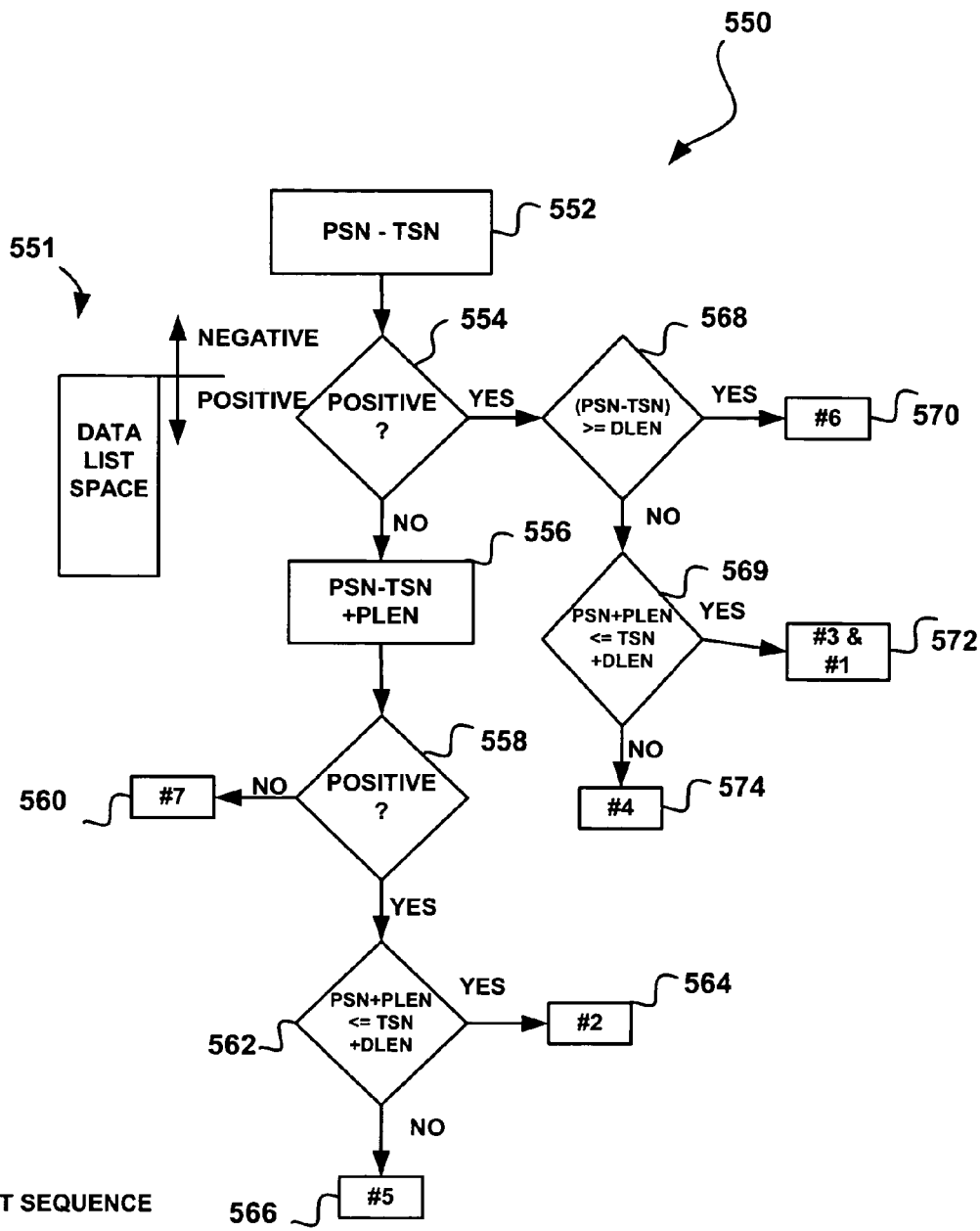
FIG. 5B illustrates an exemplary method for handling various possible combinations of data list object size in relation to an incoming data segment, in accordance with one embodiment.
Figure 5C:
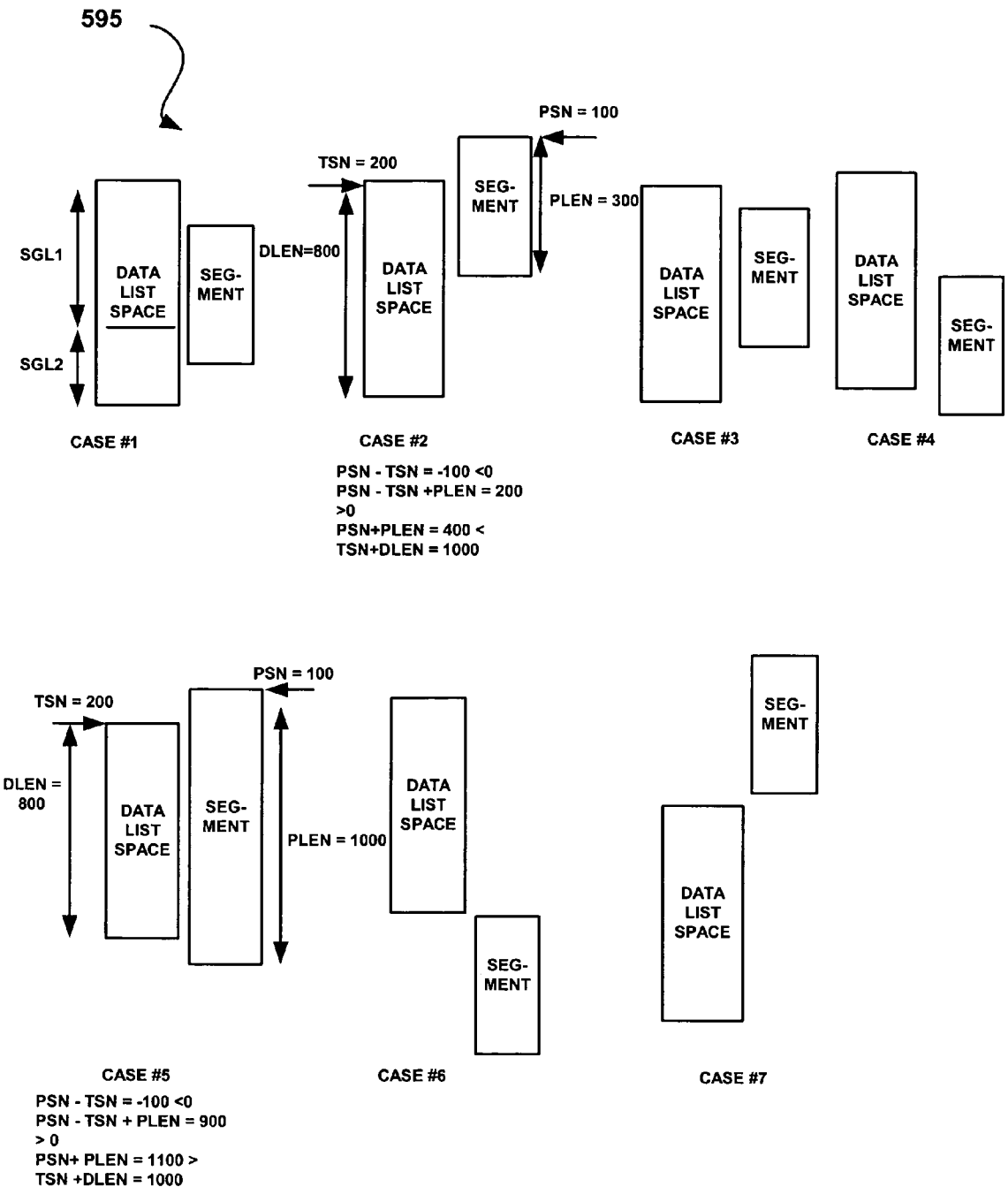
FIG. 5C illustrates exemplary case scenarios associated with the various possible combinations shown in FIG. 5B, in accordance with one embodiment.

FIG. 5B illustrates an exemplary method 550 for handling various possible combinations of data list object size in relation to an incoming data segment, in accordance with one embodiment. Moreover, FIG. 5C illustrates exemplary case scenarios 595 associated with the various possible combinations shown in FIG. 5B, in accordance with one embodiment.

As an option, the method 550 may be carried out in the context of the method 500 of FIG. 5A. Of course, however, it should be noted that the method 550 may be implemented in any desired context. In the context of the present description, the meaning of the words "positive" and "negative" are set forth by item 551 of FIG. 5B.

As shown, it is first determined in operation 552 the difference between the sequence object number [i.e. a tagged sequence number (TSN)] and the data sequence number [i.e. a packet sequence number (PSN)]. If such difference is positive (note decision 554), it is then determined in decision 568 whether the difference calculated in operation 552 is greater than or equal to the sequence object length [i.e. a data list object length (DLEN)]. If so, scenario #6 (see FIG. 5C) is present, as indicated in operation 570.

If, however, the difference calculated in operation 552 is not greater than or equal to the DLEN, it is determined in decision 569 whether the sum of the PSN and a data length [i.e. a packet length (PLEN)] is less than or equal to a sum of the TSN and DLEN. If so, either scenarios #1 or #3 (see FIG. 5C) is present, as indicated in operation 572. If not, however, scenario #4 (see FIG. 5C) is present, as indicated in operation 574.

Referring back to decision 554, if it is determined that the difference between the PSN and TSN is negative, such difference is added to the PLEN. See operation 556. Thereafter, it is determined in decision 558 whether such sum is positive. If so, scenario #7 (see FIG. 5C) is present, as indicated in operation 560. If not, however, it is determined in decision 562 whether the sum of the PSN and PLEN is less than or equal to the sum of the TSN and DLEN.

If so, scenario #2 (see FIG. 5C) is present, as indicated in operation 564. If, not, however, scenario #5 (see FIG. 5C) is present, as indicated in operation 566. Note the exemplary calculations associated with scenarios #2 and #5 illustrating the manner in which they correlate with the method 550 of FIG. 5B.

Figure 6:
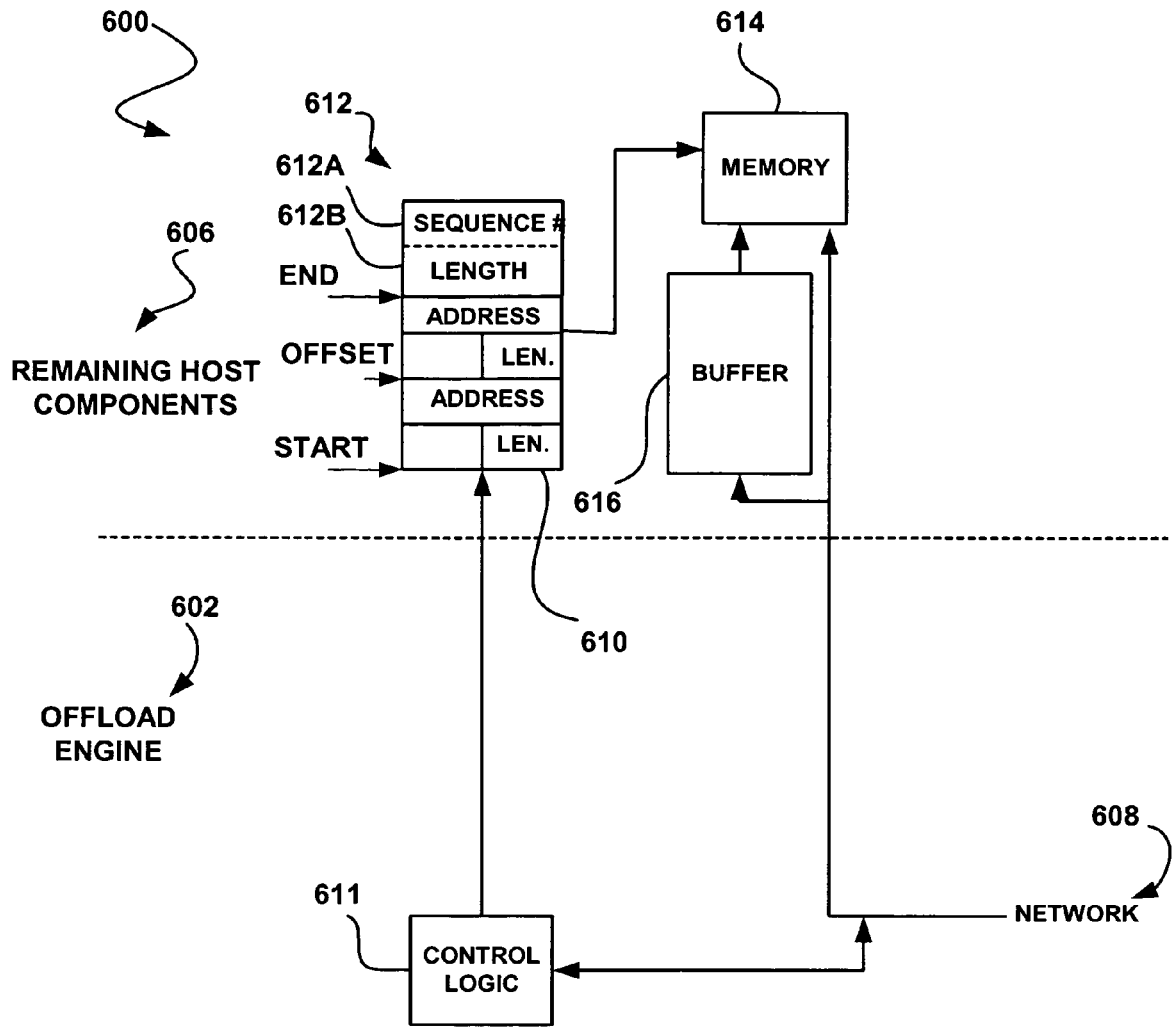
FIG. 6 illustrates an exemplary system for managing incoming data in a network using tagged data list objects, in accordance with one exemplary embodiment.

FIG. 6 illustrates an exemplary system 600 for managing incoming data in a network, in accordance with one embodiment. As an option, the system 600 may be used in the context of the disclosure of the previous figures. Of course, however, it should be noted that the system 600 may be implemented in any desired context. Most importantly, the exemplary system 600 is set forth for illustrative purposes only, and should not be considered as limiting in any manner.

As shown, the system 600 includes both a transport offload engine 602 (i.e. see, for example, transport offload engine 312 of FIG. 3), as well as components 606 of a host (see, for example, host 204 of FIGS. 2 and 3). Unlike the system of prior art FIG. 1, the transport offload engine 602 of the present system 600 does not include a TOE buffer (this is optional, i.e. simply less TOE buffer capacity may be included). Instead, a host buffer 616 in system memory (i.e. see, for example, memory 306 of FIG. 3) may be used, as needed, in the manner soon to be set forth.

To further enhance operation, a data list object 610 [i.e. a scatter-gather list (SGL), etc.] may be provided to describe various locations in application memory 614 (i.e. see again memory 306 of FIG. 3) where the incoming data will ultimately be stored. The data list object 610 is further provided with a sequence object 612. Such sequence object 612, in turn, includes a sequence object number 612A and sequence object length 612B. Together, such sequence object number 612A and sequence object length 612B defines a sequence space associated with the data list object 610.

In use, the transport offload engine 602 receives segmented data via a network 608. Once received, the transport offload engine 602 identifies a data sequence number associated with the data segment to determine whether the data sequence number falls within the sequence space associated with the data list object 610, based on the corresponding sequence object 612. This determination may be accomplished using control logic 611, or the like.

If the data sequence number does indeed fall within the sequence space associated with the data list object 610, an offset is calculated (i.e. see, for example, operation 508 of FIG. 5A) so that an address and length associated with the storage of the data may be tracked in the data list object 610. On the other hand, if the data sequence number does not fall within the sequence space associated with the existing data list object 610, the data may be temporarily stored in the host buffer 616 for later use, etc.

As an option, two (or more, for that matter) data list objects 610 may be allocated per connection. This would provide the situation where a data list object 610 is always available to a connection. If a data list object 610 is always available to a connection, this permits a "ping-pong" mode of operation. In other words, after a first data list object 610 has been used, a second data list object 610 may become active. This activation of the second data list object 610 may occur before the first data list object 610 has been fully used, and the second data list object 610 is used to replace the first data list object 610. In this fashion two or more data list objects 610 may be used in an overlapping or ping-pong fashion, thus increasing performance by giving the application sufficient time to post more buffers, if required This ping-pong mode of operation permits continuous storage of data into application memory and prevents data from spilling into host buffers which would then require an expensive data copy operation from the host buffers to the application memory.

When two or more data list objects 610 are linked on a socket in this manner to permit ping-pong mode of operation, they may be assumed to represent a contiguous sequence space. Thus, as an option, the aforementioned sequence object tag need not necessarily be used on all data list objects when using more than one data list object.

As a further option, a receive threshold may be used as a notification mechanism. When a receive threshold has been reached, triggered by the counting the amount of data received on a connection for example, a status message may be generated. Further data segments received for a data list object 610 may each generate a similar status message notification, as if the threshold had been lowered to one. In this manner, the host may know when the first data list object 610 is consumed and when the second data list object is being used. The host can then specify a new data list object in time to replace the consumed data link objects so that uninterrupted receive operation may continue.

Still yet, out-of-order data may be directly stored into application memory if the incoming data segment falls into the sequence space as represented by the data list object 610 associated with a connection. If out-of-order data falls outside the sequence space of the data list object 610, the host buffer 616 may be used to temporarily store the data. As a further option, any data list object 610 associated with a connection may never be retired until the whole sequence space has been used. Alternatively, the data list object 610 may be prematurely retired via notification from the host.

To this end, when receiving a large amount of data via the network 608, such large amounts of data may be stored in a more cost-effective manner using a transport offload engine 602.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data structure embodied on a tangible computer readable medium for use in association with a transport offload engine, comprising:
   a data list object that describes how data communicated in a network is stored in memory; and
   a sequence object stored in association with the data list object, the sequence object for identifying a sequence space associated with the data to be stored using the data list object;
   wherein the sequence object is used by a transport offload engine to determine whether incoming data is to be stored using the data list object;
   wherein the sequence object is kept as a tag together with the data list object in order to form a tagged data list object;
   wherein the sequence object includes a sequence object number that identifies a point in the sequence space and a sequence object length that identifies a length of the sequence space, and wherein the data structure is utilized such that it is determined whether the incoming data is in the sequence space associated with the data list object by determining whether a data sequence number falls within the sequence space as defined by the sequence object number and the sequence object length.

2. The data structure as recited in claim 1, wherein the data list object includes at least one data address that describes a location where the data communicated in the network is stored in the memory.

3. The data structure as recited in claim 1, wherein the data list object includes at least one of a scatter-gather list (SGL) and a memory-descriptor list (MDL).

4. The data structure as recited in claim 1, wherein, if it is determined that the incoming data is in the sequence space associated with the data list object, an offset is calculated.

5. The data structure as recited in claim 4, wherein the offset is calculated from a start point of the data list object.

6. The data structure as recited in claim 4, wherein the offset is calculated based on the sequence object of the data list object and a sequence number associated with the incoming data.

7. The data structure as recited in claim 4, wherein the incoming data is stored in association with the data list object and the offset.

8. The data structure as recited in claim 1, wherein, if it is determined that the incoming data is not in the sequence space associated with the data list object, the incoming data is stored in a buffer.

9. The data structure as recited in claim 8, wherein the buffer includes a host buffer associated with a processor.

10. The data structure as recited in claim 9, wherein the host buffer is physically separate from the memory.

11. The data structure as recited in claim 8, wherein the buffer includes a transport offload engine buffer associated with the transport offload engine.

12. The data structure as recited in claim 8, wherein a status message is sent from the transport offload engine to a processor.

13. The data structure as recited in claim 12, wherein the status message allows subsequent association of the incoming data with another data list object.

14. The data structure as recited in claim 12, wherein the status message identifies a buffer address associated with the incoming data.

15. The data structure as recited in claim 12, wherein the status message identifies a sequence number associated with the incoming data.

16. The data structure as recited in claim 12, wherein the status message identifies a socket associated with the incoming data.

17. The data structure as recited in claim 12, wherein the status message identifies the length of data stored in the buffer.

18. The data structure as recited in claim 8, wherein a first portion of the incoming data is stored in the buffer, wherein the first data portion exists at a point after a start of a data stream.

19. The data structure as recited in claim 18, wherein a remaining portion of the incoming data, after buffers have been posted, is stored using the data list object.

20. The data structure as recited in claim 1, wherein the sequence object allows transport offload engine memory on the transport offload engine to be at least minimized.

21. The data structure as recited in claim 1, wherein the memory includes application memory.

22. The data structure as recited in claim 21, wherein the sequence object allows direct data placement into the application memory.

23. The data structure as recited in claim 22, wherein the sequence object allows for lower processor utilization by enabling the direct data placement into the application memory.

24. The data structure as recited in claim 1, wherein the sequence object number is an expected future data sequence number.

25. The data structure as recited in claim 1, wherein the sequence object is used by the transport offload engine to determine whether the data is to be directly stored in application memory using the data list object or stored temporarily in a host buffer.

26. A transport offload sub-system, comprising:
a transport offload engine in communication with a hardware processor and a network, the transport offload engine capable of using:
a data list object that describes how data communicated in a network is stored in memory, and
a sequence object stored in association with the data list object, the sequence object for identifying a sequence space associated with the data to be stored using the data list object;
wherein the sequence object is used by the transport offload engine to determine whether incoming data is to be stored in association with the data list object;
wherein the transport offload sub-system is operable such that the sequence object is kept as a tag together with the data list object in order to form a tagged data list object;
wherein the sequence object includes a sequence object number that identifies a point in the sequence space and a sequence object length that identifies a length of the sequence space, and wherein the transport offload sub-system is operable such that is determined whether the incoming data is in the sequence space associated with the data list object by determining whether a data sequence number falls within the sequence space as defined by the sequence object number and the sequence object length.

27. A system, comprising:
a hardware processor;
a transport offload engine in communication with the processor via a bus, the transport offload engine capable of using:
a data list object that describes how data communicated in a network is stored in memory, and
a sequence object stored in association with the data list object, the sequence object for identifying a sequence space associated with the data to be stored using the data list object;
wherein the sequence object is used by the transport offload engine to determine whether incoming data is to be stored in association with the data list object;
wherein the system is operable such that the sequence object is kept as a tag together with the data list object in order to form a tagged data list object;
wherein the sequence object includes a sequence object number that identifies a point in the sequence space and a sequence object length that identifies a length of the sequence space, and wherein the system is operable such that it is determined whether the incoming data is in the sequence space associated with the data list object by determining whether a data sequence number falls within the sequence space as defined by the sequence object number and the sequence object length.

28. A method for using tagged data list objects in managing network communications, comprising:
receiving data from a network;
identifying a data sequence number associated with the data; and
determining whether the data resides in a sequence space associated with a data list object based on a sequence object of the data list object and the data sequence number associated with the data, utilizing a hardware processor;
wherein the sequence object is kept as a tag together with the data list object in order to form a tagged data list object;
wherein the sequence object includes a sequence object number that identifies a point in the sequence space and a sequence object length that identifies a length of the sequence space, and wherein it is determined whether the data is in the sequence space associated with the data list object by determining whether a data sequence number falls within the sequence space as defined by the sequence object number and the sequence object length.

29. The method as recited in claim 28, wherein the data list object includes at least one data address and data length.

30. The method as recited in claim 29, and further comprising:
if it is determined that the data is in the sequence space associated with the data list object,
calculating an offset from a start point of the data list object based on the sequence object of the data list object and the data sequence number, and
storing the data in association with the data list object and the offset; and
if it is determined that the data is not in the sequence space associated with the data list object, storing the data in a host buffer associated with a processor, and sending a status message from the transport offload engine to the processor identifying a buffer address and the data sequence number associated with the data for allowing subsequent association of the data with another data list object.

31. The method as recited in claim 28, wherein the data sequence number includes a steering tag.

32. A method, comprising:

receiving data from a network;

identifying a data number associated with the data; and determining whether the data resides in a space associated with a data list object based on an object of the data list object and the data number associated with the data, utilizing a hardware processor;

wherein the object is kept as a tag together with the data list object in order to form a tagged data list object;

wherein the object includes an object number that identifies a point in the space and an object length that identifies a length of the space, and wherein it is determined whether the data is in the space associated with the data list object by determining whether a data number falls within the space as defined by the object number and the object length.

\* \* \* \* \*